United States Patent
Jang et al.

(10) Patent No.: US 8,848,649 B2
(45) Date of Patent: Sep. 30, 2014

(54) METHOD FOR TRANSMITTING AN UPLINK SIGNAL, AND APPARATUS FOR SAME

(75) Inventors: Jiwoong Jang, Anyang-si (KR); Jaehoon Chung, Anyang-si (KR); Hyunwoo Lee, Anyang-si (KR); Hyunsoo Ko, Anyang-si (KR); Jinmin Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/808,867

(22) PCT Filed: Jul. 12, 2011

(86) PCT No.: PCT/KR2011/005100
§ 371 (c)(1),
(2), (4) Date: Jan. 7, 2013

(87) PCT Pub. No.: WO2012/008730
PCT Pub. Date: Jan. 19, 2012

(65) Prior Publication Data
US 2013/0114391 A1    May 9, 2013

Related U.S. Application Data

(60) Provisional application No. 61/363,285, filed on Jul. 12, 2010.

(51) Int. Cl.
*H04W 4/00* (2009.01)
*H04W 72/04* (2009.01)
*H04L 5/00* (2006.01)
*H04L 1/16* (2006.01)
*H04L 1/00* (2006.01)
*H04L 25/03* (2006.01)

(52) U.S. Cl.
CPC ........ *H04W 72/0413* (2013.01); *H04L 5/0053* (2013.01); *H04L 1/1664* (2013.01); *H04L 1/1671* (2013.01); *H04L 1/0026* (2013.01); *H04L 25/03929* (2013.01); *H04L 5/005* (2013.01); *H04L 5/0007* (2013.01)
USPC .......................................... 370/329; 370/341

(58) Field of Classification Search
None
See application file for complete search history.

(56) References Cited

U.S. PATENT DOCUMENTS

| | | | |
|---|---|---|---|
| 2002/0094834 A1 | 7/2002 | Baker et al. | |
| 2008/0298224 A1* | 12/2008 | Pi et al. | 370/204 |
| 2009/0092148 A1* | 4/2009 | Zhang et al. | 370/458 |
| 2009/0290538 A1 | 11/2009 | Kim et al. | |
| 2010/0105406 A1* | 4/2010 | Luo et al. | 455/452.2 |

(Continued)

FOREIGN PATENT DOCUMENTS

| | | |
|---|---|---|
| KR | 2002-0087939 A | 11/2002 |
| KR | 10-2009-0017408 A | 2/2009 |
| KR | 10-2009-0111271 A | 10/2009 |

*Primary Examiner* — Chi Pham
*Assistant Examiner* — Soon-Dong D Hyun
(74) *Attorney, Agent, or Firm* — Birch, Stewart, Kolasch & Birch, LLP

(57) ABSTRACT

The present invention relates to a wireless communication system. More particularly, the present invention relates to a method for transmitting an uplink signal, comprising: multiplexing control information and multiple pieces of data information; and transmitting the multiplexed control information and multiple pieces of data information through a physical uplink shared channel. The number Q' of modulation symbols for transmitting the multiplexed control information is determined by a specific mathematical expression, and selection offset â is a value which is set by a preset condition from among the offset values corresponding to the respective data information.

16 Claims, 9 Drawing Sheets

(56) References Cited

U.S. PATENT DOCUMENTS

2010/0254483 A1* 10/2010 Chun et al. ............... 375/295
2011/0200003 A1* 8/2011 Pi et al. .................... 370/330
2011/0211510 A1 9/2011 Kim et al.
2011/0305226 A1* 12/2011 Zhang et al. .............. 370/336
2012/0213176 A1* 8/2012 Kwak et al. ............... 370/329
2012/0218910 A1* 8/2012 Sarikaya .................... 370/252
2013/0034089 A1* 2/2013 Nakashima et al. ....... 370/337
2014/0071913 A1* 3/2014 Pi et al. .................... 370/329

* cited by examiner

METHOD FOR TRANSMITTING AN UPLINK SIGNAL, AND APPARATUS FOR SAME

CROSS REFERENCE TO RELATED APPLICATIONS

This application is the National Phase of PCT/KR2011/005100 filed on Jul. 12, 2011, which claims priority under 35 U.S.C. 119(e) to U.S. Provisional Application No. 61/363,285 filed on Jul. 12, 2010, all of which are hereby expressly incorporated by reference into the present application.

TECHNICAL FIELD

The present invention relates to a wireless communication system, and more particularly, to a method and apparatus for transmitting control information.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

Technical Problems

It is an object of the present invention to provide a method and apparatus for efficiently transmitting an uplink signal in a wireless communication system. It is another object of the present invention to provide a method and apparatus for efficiently transmitting control information through a plurality of data blocks. It is a further object of the present invention to provide a method and apparatus for efficiently multiplexing control information and data.

It will be appreciated by persons skilled in the art that the technical objects that can be achieved through the present invention are not limited to what has been particularly described hereinabove and other technical objects of the present invention will be more clearly understood from the following detailed description.

Technical Solutions

In an aspect of the present invention, a method for transmitting an uplink signal at a user equipment in a wireless communication system includes multiplexing control information and a plurality of pieces of data information, and transmitting the multiplexed control information and the plurality of pieces of data information on a physical uplink shared channel, wherein the number of modulation symbols, $Q'$, for transmitting the multiplexed control information is determined by the following Equation a:

$$Q' = \left\lceil \frac{O \cdot M_{SC}^{DATA} \cdot N_{Symb}^{DATA} \cdot \beta_{set}}{\sum_{i=0}^{N_{TB}-1} TBS_i} \right\rceil \quad [\text{Equation a}]$$

where O is the number of bits of the control information, $$\sum_{i=0}^{N_{TB}-1} TBS_i$$

is the sum of the numbers of bits of the plurality of pieces of data information, $M_{SC}^{DATA}$ is a frequency band scheduled for transmission of the plurality of pieces of data information, $N_{symb}^{DATA}$ is the number of symbols per subframe for transmission of the plurality of pieces of data information, $\lceil\ \rceil$ is a ceiling function, and $N_{TB}$ is the number of the plurality of pieces of data information, and wherein a selection offset $\beta_{sel}$ is a value set by a preset condition among offset values corresponding respectively to the plurality of pieces of data information.

The control information may be any one of Acknowledgment/Negative-Acknowledgment (ACK/NACK) information and Rank Indication (RI) information.

The selection offset $\beta_{sel}$ may be an offset corresponding to data information multiplexed with Channel Quality Indicator (CQI) information.

The selection offset $\beta_{sel}$ may be any one of an offset corresponding to data information having a highest Modulation Coding Scheme (MCS) level among the plurality of pieces of data information and an offset corresponding to data information having a lowest MCS level among the plurality of pieces of data information.

The selection offset $\beta_{sel}$ may be any one of a smallest offset and a largest offset among offsets corresponding respectively to the plurality of pieces of data information.

The selection offset $\beta_{sel}$ may be an average of offsets corresponding respectively to the plurality of pieces of data information.

The selection offset $\beta_{sel}$ may be selected according to the following Equation 2 by an average of offsets using an offset $\beta_i$ corresponding to each of the plurality of pieces of data information and using the number of layers corresponding respectively to the plurality of pieces of data information:

$$\beta_{set} = \frac{\sum_{i=0}^{N_{TB}-1} N_{Layer}^i \cdot \beta_i}{\sum_{i=0}^{N_{TB}-1} N_{Layer}^i} \quad [\text{Equation b}]$$

where $N_{Layer}^i$ is the number of layers for specific data information and $N_{TB}$ is the number of the plurality of pieces of data information.

The selection offset $\beta_{sel}$ may be one of an offset corresponding to data information having a largest Transport Block Size (TBS) among the plurality of pieces of data information and an offset corresponding to data information having a smallest TBS among the plurality of pieces of data information.

In another aspect of the present invention, a user equipment for transmitting an uplink signal in a wireless communication system includes a processor for multiplexing control information and a plurality of pieces of data information, and a Radio Frequency (RF) unit for transmitting the multiplexed control information and the plurality of pieces of data information on a physical uplink shared channel, wherein the number of modulation symbols, Q', for transmitting the multiplexed control information is determined by the Equation a and wherein a selection offset $\beta_{sel}$ is a value set by a preset condition among offset values corresponding respectively to the plurality of pieces of data information. Although the number of modulation symbols, Q', for transmitting the multiplexed control information is set using equations other than the equation 'a', the method proposed in the present invention is applicable to the case in which an offset $\beta_{sel}$ which is an energy ratio per information bit of data and control information is used in the process of calculating the number of modulation symbols.

Advantageous Effects

According to the present invention, an uplink signal can be efficiently transmitted in a wireless communication system. In addition, control information can be efficiently transmitted using an optimal resource. Furthermore, control information and data can be efficiently multiplexed.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used in various wireless multiple access systems including Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA) systems. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, and Evolved-UTRA (E-UTRA). UTRAN is a part of Universal Mobile Telecommunication System (UMTS). 3rd Generation Partnership Project (3GPP) Long Term Evolution (LTE) is a part of Evolved UMTS (E-UMTS) using E-UTRAN and employs OFDMA on downlink and SC-FDMA on uplink. LTE-Advanced (LTE-A) is an evolved version of 3GPP LTE.

For a clear description, while the following description is given focusing upon a 3GPP LTE/LTE-A wireless communication system, the technical features of the present invention are not limited thereto. Further, specific terms used in the following description are provided to aid in understanding the present invention and such specific terms may be modified in other forms without departing from the technical sprit of the present invention.

Figure 1:
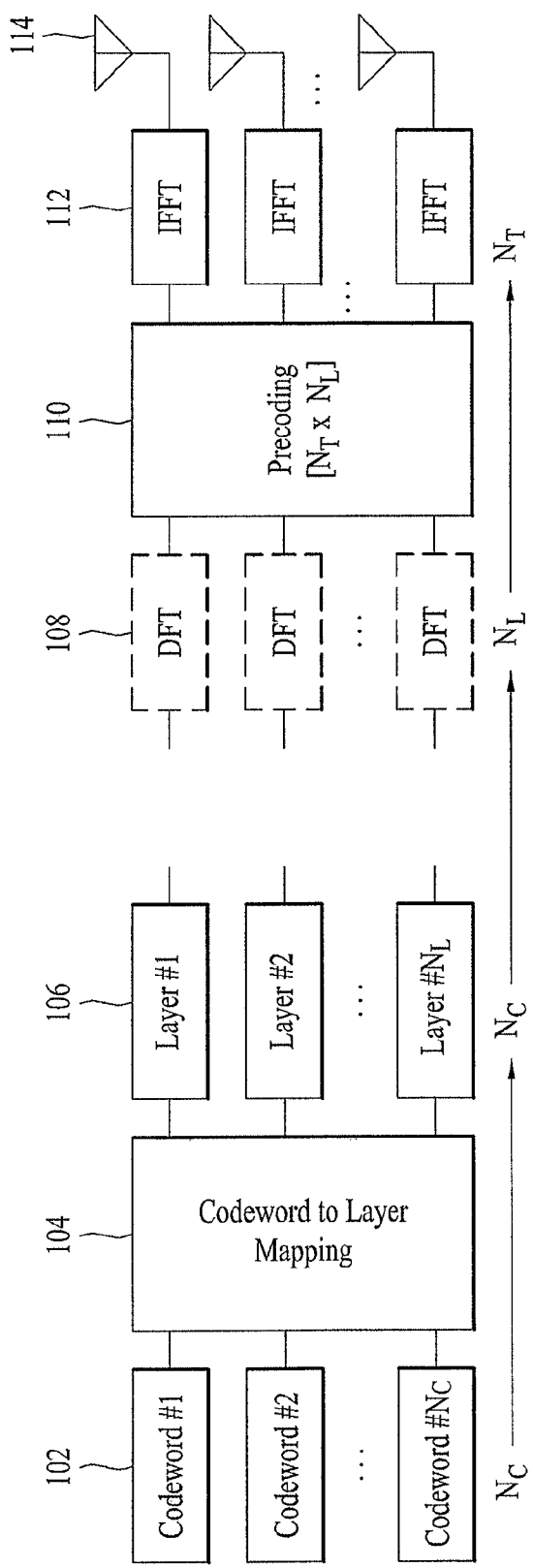
FIG. 1 illustrates a MIMO transmitter/receiver.

FIG. 1 illustrates a Multiple Input Multiple Output (MIMO) transmitter/receiver. Specifically, FIG. 1 illustrates an OFDM or SC-FDMA (referred also to as DFT spread OFDM or DFT-s-OFDM) transmitter/receiver supporting MIMO. If a DFT block 108 is not present, FIG. 3 corresponds to the OFDM transmitter/receiver and, if the DFT block 108 is present, FIG. 3 corresponds to the SC-FDMA transmitter/receiver. For convenience, description of FIG. 1 will be given focusing upon operation of the transmitter. Operation of the receiver is performed in the reverse manner to operation of the transmitter.

Referring to FIG. 1, a codeword-to-layer mapper 104 maps $N_c$ codewords 102 belonging to a layer L to $N_L$ layers 106. Codewords are mapped to transport blocks transmitted from a Medium Access Control (MAC) layer in a one-to-one correspondence. A correspondence relationship between the transport blocks and the codewords may be changed by codeword swapping. Generally, a rank is equivalent to the number of layers in a communication system. In the SC-FDMA transmitter, the DFT block 108 performs DFT transform precoding with respect to the respective layers 106. A precoding block 110 multiplies the $N_L$ DFT transformed layers by a precoding vector/matrix. Through this process, the precoding block 110 maps the $N_L$ DFT transformed layers to $N_T$ Inverse Fast Fourier Transform (IFFT) blocks 112 and antenna ports 114. The antenna ports 114 may further be mapped to actual physical antennas.

Figure 2:
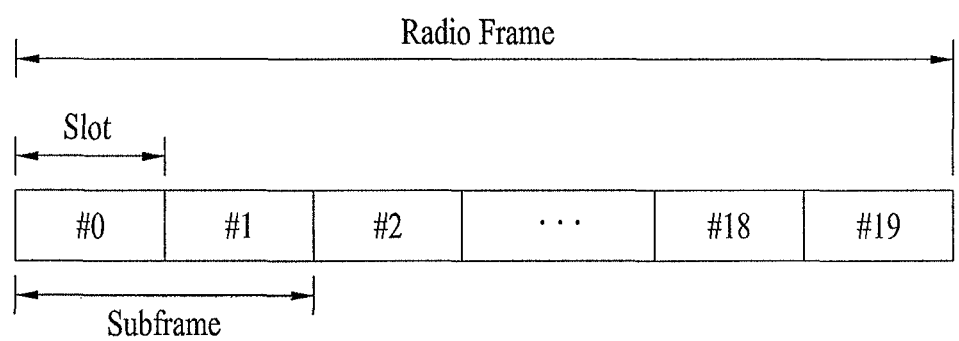
FIG. 2 illustrates the structure of a radio frame.

FIG. 2 illustrates the structure of a radio frame.

Referring to FIG. 2, a radio frame includes 10 subframes. Each subframe includes two slots in the time domain. A time for transmitting a subframe is defined as a Transmission Time Interval (TTI). For example, one subframe may have a length of 1 ms and one slot may have a length of 0.5 ms. One slot includes a plurality of Orthogonal Frequency Division Multiplexing (OFDM) or Single Carrier Frequency Division Multiple Access (SC-FDMA) symbols in the time domain. In an LTE system, OFDM symbols are used on downlink (DL) and SC-FDMA symbols are used on uplink (UL) and thus OFDM or SC-FDMA symbols denote one symbol duration. A Resource Block (RB) is a resource allocation unit and includes a plurality of consecutive subcarriers. The structure of the radio frame shown in FIG. 2 is purely exemplary and various modifications may be made in the number of subframes included in the radio frame, the number of slots included in the subframe, or the number of symbols included in the slot.

Figure 3:
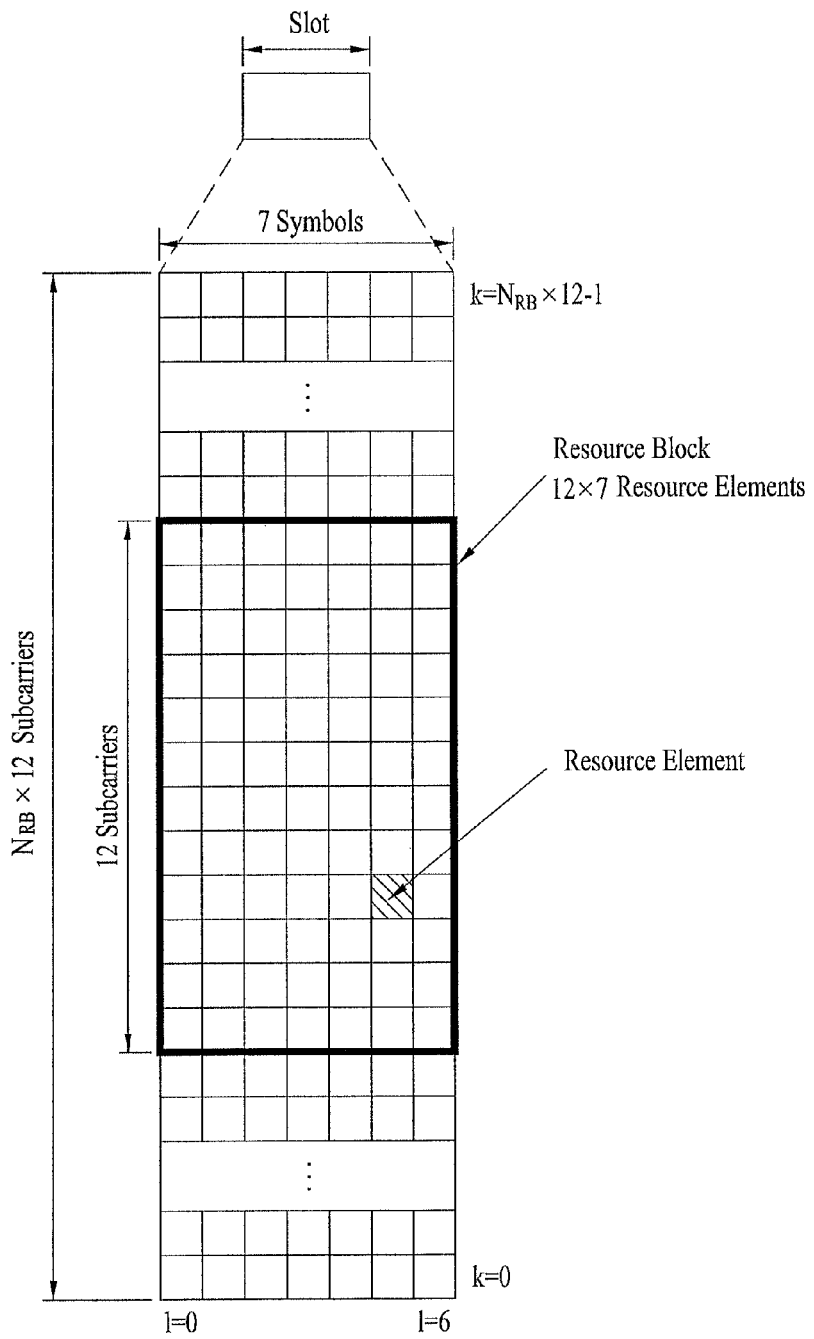
FIG. 3 illustrates a resource grid for a downlink slot.

FIG. 3 illustrates a resource grid for a DL slot.

Referring to FIG. 3, a DL slot includes a plurality of OFDM symbols in the time domain. One DL slot may include 7 (or 6) OFDM symbols and an RB may include 12 subcarriers in the frequency domain. Each element on a resource grid is referred to a Resource Element (RE). One RB includes 12×7 (or 6) REs. The number of RBs included in a DL slot, $N_{RB}$, depends on DL transmission band. The structure of a UL slot is equal to the structure of the DL slot except that OFDM symbols are replaced with SC-FDMA symbols.

Figure 4:
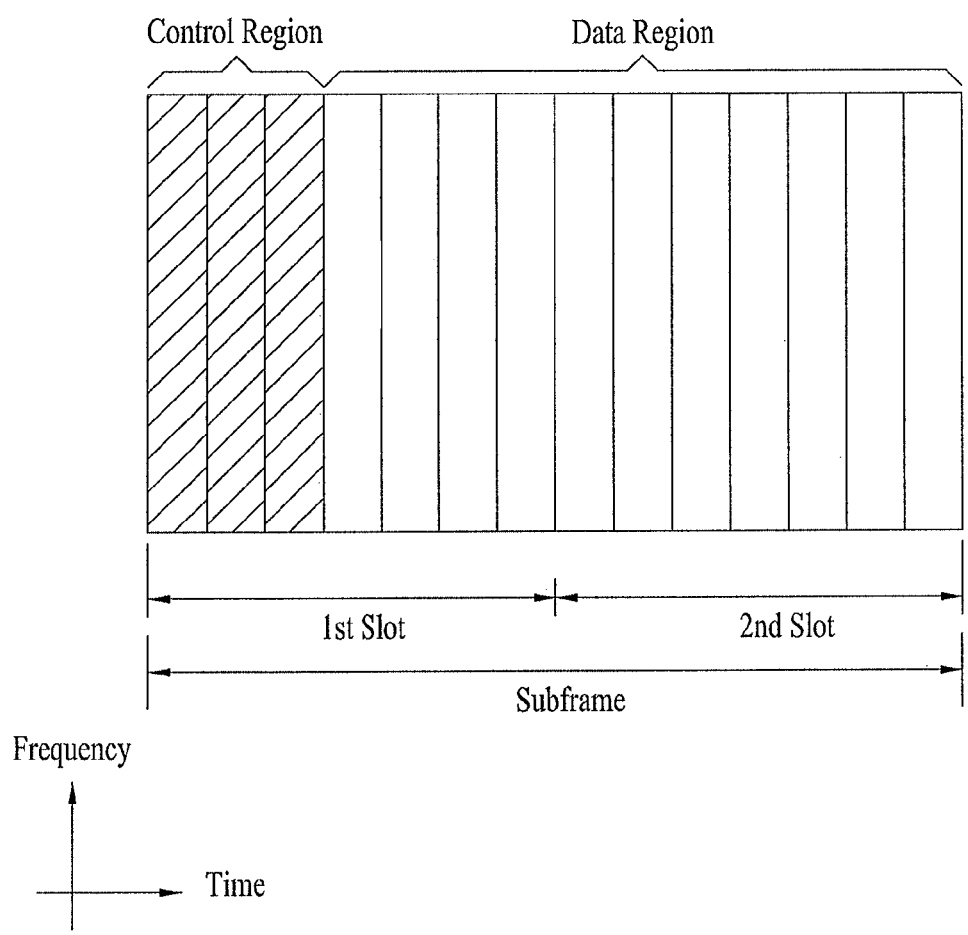
FIG. 4 illustrates the structure of a downlink subframe.

FIG. 4 illustrates the structure of a DL subframe.

Referring to FIG. 4, a maximum of 3 (or 4) OFDM symbols in the front portion of the first slot of a subframe corresponds to a control region to which a control channel is allocated and the remaining OFDM symbols correspond to a data region to which a Physical Downlink Shared Channel (PDSCH) is allocated. DL control channels used in LTE include a Physical Control Format Indicator Channel (PCFICH), a Physical Downlink Control Channel (PDCCH), and a Physical Hybrid automatic repeat request Indicator Channel (PHICH). The PCFICH is transmitted on the first OFDM symbol of the subframe and carries information about the number of OFDM symbols used for transmission of the control channel in the subframe. The PHICH carries a Hybrid Automatic Repeat reQuest Acknowledgment/Negative-Acknowledgment (HARQ ACK/NACK) signal as a response to UL transmission.

Control information transmitted through the PDCCH is referred to as Downlink Control Information (DCI). The DCI includes resource allocation information for a User Equipment (UE) or a UE group and other control information. For example, the DCI includes UL/DL scheduling information, a UL transmit (Tx) power control command, etc.

The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCHs are transmitted on an aggregate of one or plural consecutive Control Channel Elements (CCEs). A CCE is a logical allocation unit used to provide the PDCCH with coding rate based on a radio channel state. The CCE corresponds to a plurality of Resource Element Groups (REGs). A format of the PDCCH and the number of bits of the PDCCH are determined according to the number of CCEs. A Base Station (BS) determines the format of the PDCCH according to DCI to be transmitted to the UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI)) may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Control information transmitted through the PDCCH is referred to as DCI. The DCI includes resource allocation information for a UE or a UE group and other control information. For example, the DCI includes UL/DL scheduling information, a UL Tx power control command, etc.

Table 1 indicates DCI format 0 for UL scheduling. While the size of RB allocation field is represented as 7 bits in Table 1, this is purely exemplary and the actual size of the RB allocation field varies with system bandwidth.

TABLE 1

| Field | Bits | Comment |
|---|---|---|
| Format | 1 | Uplink grant or downlink assignment |
| Hopping flag | 1 | Frequency hopping on/off |
| RB assignment | 7[a] | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS (Modulation and Coding Scheme)
TPC (Transmit Power Control)
RNTI (Radio Network Temporary Identifier)
CRC (Cyclic Redundancy Check)

Table 2 indicates information about an MCS index for transmission of UL data in LTE. Five bits are used for MCS and three states ($I_{MCS}$=29 to 31) among states that can be expressed by five bits are used for UL retransmission.

TABLE 2

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Figure 5:
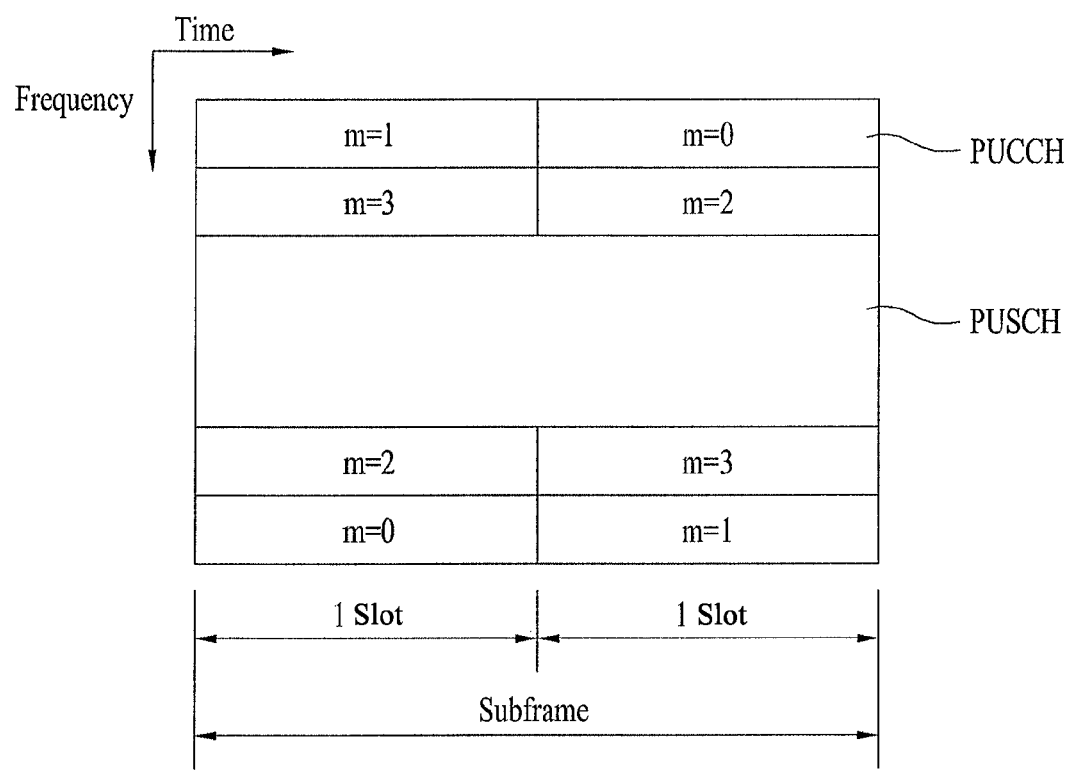
FIG. 5 illustrates the structure of an uplink subframe.

FIG. 5 illustrates the structure of a UL subframe used in LTE.

Referring to FIG. 5, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a PUSCH and is used to transmit data signals such as voice signals. The control region includes a PUCCH and is used to transmit Uplink Control Information (UCI). The PUCCH includes an RB pair located at both ends of the data region in the frequency domain and is hopped using the slot as a boundary.

The PUCCH may be used for transmitting the following control information.

Scheduling Request (SR): This information is used for requesting a UL-SCH resource.

HARQ ACK/NACK: This information is a response signal to a DL data packet on a PDSCH, indicating whether the DL data packet has successfully been received. 1-bit ACK/NACK is transmitted as a response to a single DL codeword and 2-bit ACK/NACK is transmitted as a response to two DL codewords.

Channel Quality Indicator (CQI): This information is feedback information for a DL channel. MIMO-related feedback information includes a Rank Indicator (RI) and a Precoding Matrix Indicator (PMI). 20 bits are used per subframe.

The amount of UCI that a UE can transmit in a subframe depends on the number of available SC-FDMA symbols. The available SC-FDMA symbols for transmission of control information indicates remaining SC-FDMA symbols except for SC-FDMA symbols for transmission of a reference signal and except for the last SC-FDMA symbol of a subframe if a Sounding Reference Signal (SRS) is configured in the subframe. The reference signal is used for coherent detection of a PUCCH. The PUCCH supports 7 formats according to transmitted information.

Table 3 indicates a mapping relationship between a PUCCH format and UCI.

TABLE 3

| PUCCH Format | Uplink Control Information (UCI) |
|---|---|
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

In LTE-A, a method for simultaneously transmitting UCI and UL-SCH data is divided into two methods. The first method is to simultaneously transmit a PUCCH and a PUSCH and the second method is to multiplex UCI with the PUSCH as in legacy LTE.

Since a legacy LTE UE cannot simultaneously transmit the PUCCH and PUSCH, if UCI (e.g. CQI/PMI, HARQ-ACK, PI, etc.) needs to be transmitted, a method for multiplexing UCI one PUSCH region has been used. For example, CQI and/or PMI (CQI/PMI) need to be transmitted in a subframe in which PUSCH transmission is allocated, a UE multiplexes UL-SCH data and CQI/PMI before DFT-spreading and transmit the control information and data through the PUSCH.

Figure 6:
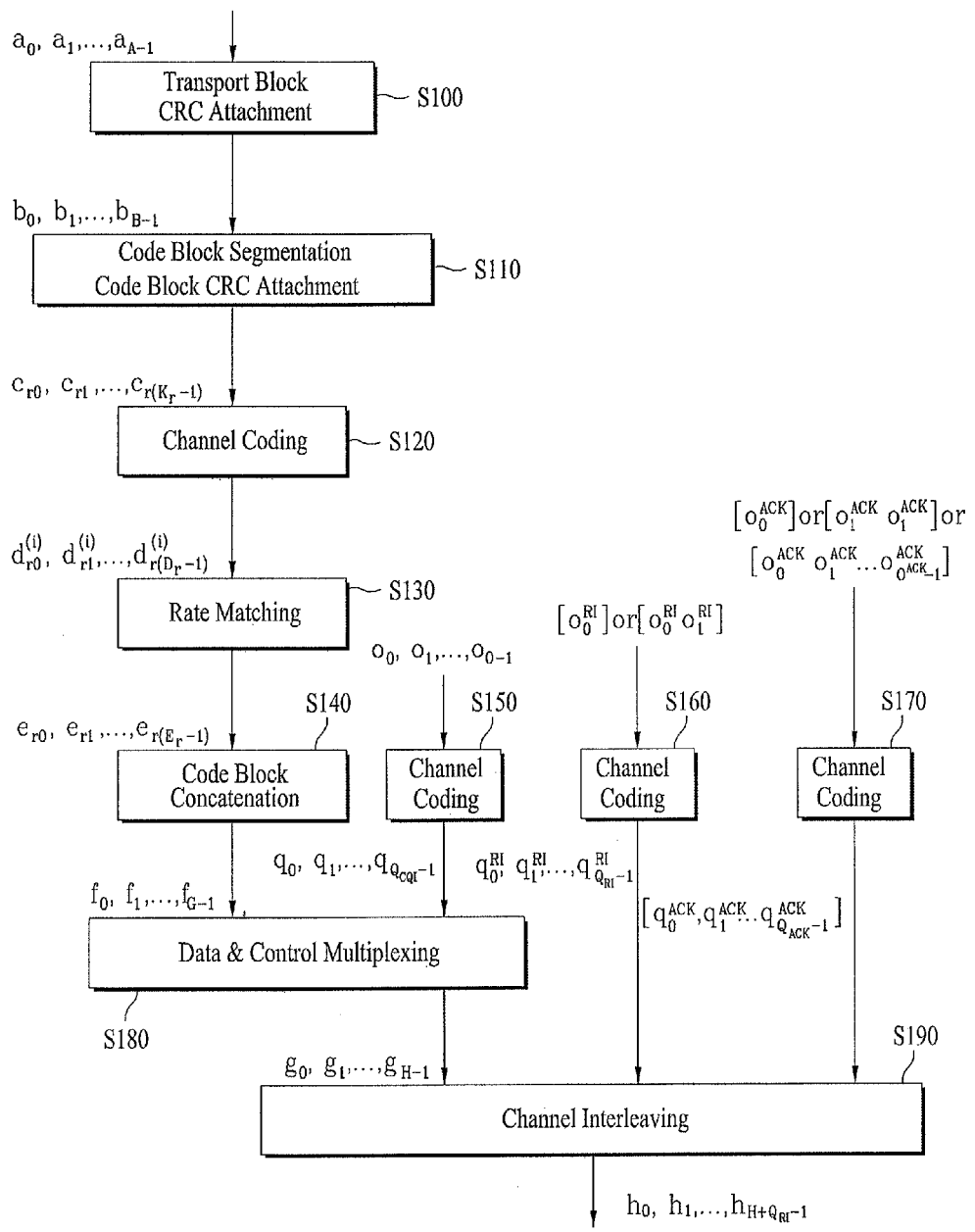
FIG. 6 illustrates a processing operation of UL-SCH data and control information.

FIG. 6 illustrates a processing operation of UL-SCH data and control information.

Referring to FIG. 6, CRC is provided for error detection on a UL-SCH transport block (S100).

The whole transport block is used to calculate CRC parity bits. Bits of the transport block are $a_0, a_1, a_2, a_3, \ldots, a_{A-1}$ and parity bits are denoted by $p_0, p_1, p_2, p_3, \ldots, p_{L-1}$. The size of the transport block is A and the number of parity bits is L.

Code block segmentation and code block CRC attachment are performed after transport block CRC attachment (S110). Bits input for code block segmentation are $b_0, b_1, b_2, b_3, \ldots, b_{B-1}$ where B is the number of bits of the transport block (including CRC). Bits provided after code block segmentation are $c_{r0}, c_{r1}, c_{r2}, c_{r3}, \ldots, c_{r(K_r-1)}$ where r is a code block number (r=0, 1, ..., C-1), $K_r$ is the number of bits of the code block r, and C is the total number of code blocks.

Channel coding is performed after code block segmentation and code block CRC attachment (S120). Bits after channel coding are $d_{r0}^{(i)}, d_{r1}^{(i)}, d_{r2}^{(i)}, d_{r3}^{(i)}, \ldots, d_{r(D_r-1)}^{(i)}$ where i=0, 1, 2, $D_r$ is the number of bits of an i-th coded stream for the code block r (i.e. $D_r = K_r + 4$), r is a code block number (r=0, 1, ..., C-1), $K_r$ is the number of bits of the code block r, and C is the total number of code blocks. Turbo coding may be used for channel coding.

Rate matching is performed after channel coding (S130). Bits after rate matching are $e_{r0}, e_{r1}, e_{r2}, e_{r3}, \ldots, e_{r(E_r-1)}$ where $E_r$ is the number of rate-matched bits of an r-th code block, r=0, 1, ..., C-1, and C is the total number of code blocks.

Code block concatenation is performed after rate matching (S140). Bits after code block concatenation are $f_0, f_1, f_2, f_3, \ldots, f_{G-1}$ where G is the total number of coded bits for transmission. When control information is multiplexed with UL-SCH transmission, bits used for transmission of the control information are not included in G. The bits $f_0, f_1, f_2, f_3, \ldots, f_{G-1}$ correspond to UL-SCH codewords.

In the case of UCI, independent channel coding is performed with respect to channel quality information (CQI and/or PMI), RI, and HARQ-ACK. Channel coding of the UCI is performed based on the number of encoded symbols for corresponding control information. For example, the number of encoded symbols may be used for rate matching of coded control information. The number of encoded symbols corresponds to the number of modulation symbols, the number of REs, etc., in a subsequent process.

Channel coding of CQI is performed using an input bit sequence $o_0, o_1, o_2, \ldots, o_{O-1}$ (S150). An output bit sequence of channel coding for the CQI is $q_0, q_1, q_2, q_3, \ldots, q_{Q_{CQI}-1}$. A channel coding scheme applied to CQI varies with the number of bits. When the number of bits of the CQI is above 11 bits, an 8-bit CRC is attached. $Q_{CQI}$ denotes the total number of encoded bits. To match the length of a bit sequence to $Q_{CQI}$, the encoded CQI may be rate-matched. $Q_{CQI} = Q'_{CQI} \times Q_m$, $Q'_{CQI}$ is the number of encoded symbols for the CQI, and $Q_m$ is a modulation order. $Q_m$ is set to that of UL-SCH data.

Channel coding of RI is performed using an input sequence $[o_0^{RI}]$ or $[o_0^{RI} \, o_1^{RI}]$ (S160). $[o_0^{RI}]$ and $[o_0^{RI} \, o_1^{RI}]$ indicate 1-bit RI and 2-bit RI, respectively.

Repetition coding is used for the 1-bit RI. For the 2-bit RI, encoding is performed using a (3, 2) simplex code and repetition coding is performed.

Table 4 shows an example of channel coding of the 1-bit RI and Table 5 shows an example of channel coding of the 2-bit RI.

TABLE 4

| $Q_m$ | Encoded RI |
|---|---|
| 2 | $[o_0^{RI} \, y]$ |
| 4 | $[o_0^{RI} \, y \, x \, x]$ |
| 6 | $[o_0^{RI} \, y \, x \, x \, x \, x]$ |

TABLE 5

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

Here, Qm denotes a modulation order. $o_2^{RI} = (o_0^{RI} + o_1^{RI})$ mod 2 and 'mod' denotes a modulo operation. 'x' and 'y' are placeholders for maximizing the Euclidean distance of a modulation symbol carrying RI information when an RI bit is scrambled. 'x' always has a value of 1 and 'y' has the same value as a value of an immediately preceding bit. An output bit sequence $q_0^{RI}, q_1^{RI}, q_2^{RI}, \ldots, q_{Q_{RI}-1}^{RI}$ is obtained by concatenation of encoded RI blocks where $Q_{RI}$ is the total number of bits used for transmission of the RI. The last concatenated encoded RI block may be partial so that the length of the encoded RI is equal to $Q_{RI}$ (i.e. rate matching). $Q_{RI} = Q'_{RI} \times Q_m$, $Q'_{RI}$ is the number of encoded symbols for CQI, and $Q_m$ is a modulation order. $Q_m$ is set to that of UL-SCH data.

Channel coding of a HARQ-ACK is performed using an input sequence $[o_0^{ACK}]$ $[o_0^{ACK}\ o_1^{ACK}]$, or $[o_0^{ACK}\ o_1^{ACK} \ldots o_{O^{ACK}-1}^{ACK}]$ of step S170. $[o_0^{ACK}]$ and $[o_0^{ACK}\ o_1^{ACK}]$ indicate a 1-bit HARQ-ACK and a 2-bit HARQ-ACK, respectively. $[o_0^{ACK}\ o_1^{ACK} \ldots o_{O^{ACK}-1}^{ACK}]$ indicated a HARQ-ACK consisting of information of two bits or more (i.e. $O^{ACK} > 2$) ACK is encoded to 1 and NACK is encoded to 0. Repetition coding is used for the 1-bit HARQ-ACK. For the 2-bit HARQ-ACK, encoding is performed using a (3, 2) simplex code and repetition coding is performed.

Table 6 shows an example of channel coding of the 1-bit HARQ-ACK and Table 7 shows an example of channel coding of the 2-bit HARQ-ACK.

TABLE 6

| $Q_m$ | Encoded HARQ-ACK |
|---|---|
| 2 | $[o_0^{ACK}\ y]$ |
| 4 | $[o_0^{ACK}\ y\ x\ x]$ |
| 6 | $[o_0^{ACK}\ y\ x\ x\ x\ x]$ |

TABLE 7

| $Q_m$ | Encoded HARQ-ACK |
|---|---|
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ |

Here, Qm denotes a modulation order. For example, Qm=2, 4, and 6 may correspond to QPSK, 16 QAM, and 64 QAM, respectively. $o_0^{ACK}$ represents an ACK/NACK bit for codeword 0 and $o_1^{ACK}$ represents an ACK/NACK bit for codeword 1. $o_2^{ACK} = (o_0^{ACK} + o_1^{ACK})$ mod2 and 'mod' denotes a modulo operation. 'x' and 'y' are placeholders for maximizing the Euclidean distance of a modulation symbol carrying HARQ-ACK information when an HARQ-ACK bit is scrambled. 'x' always has a value of 1 and 'y' has the same value as a value of an immediately preceding bit.

$Q_{ACK}$ denotes the total number of bits used for transmission of ACK. A bit sequence $q_0^{ACK}, q_1^{ACK}, q_2^{ACK}, \ldots, q_{Q_{ACK}-1}^{ACK}$ is obtained by concatenation of encoded HARQ-ACK blocks. The last concatenated encoded HARQ-ACK block may be partial (i.e. rate matching) so that the length of bit sequences is equal to $Q_{ACK}$. $Q_{ACK} = Q'_{ACK} \times Q_m$, $Q'_{ACK}$ is the number of modulation symbols for transmission of the HARQ-ACK, and $Q_m$ is a modulation order. $Q_m$ is set to that of UL-SCH data.

Inputs of a data/control multiplexing block are UL-SCH encoded bits $f_0, f_1, f_2, f_3, \ldots, f_{G-1}$ and encoded CQI/PMI bits $q_0, q_1, q_2, q_3, \ldots, q_{Q_{CQI}-1}$ (S180). An output of the data/control multiplexing block is $g_0, g_1, g_2, g_3, \ldots, g_{H'-1}$ where $g_i$ (i=0, ..., H'-1) is a column vector of length $Q_m$, $H'=H/Q_m$, $H=(G+Q_{CQI})$, and H is the total number of encoded bits allocated for UL-SCH data and CQI/PMI.

Channel interleaving is performed with respect to the output of the data/control multiplexing block, $g_0, g_1, g_2, \ldots, g_{H'-1}$, the encoded RI $q_0^{RI}, q_1^{RI}, q_2^{RI}, \ldots, q_{Q'_{RI}-1}^{RI}$, and the coded HARQ-ACK $q_0^{ACK}, q_1^{ACK}, q_2^{ACK}, \ldots, q_{Q'_{ACK}-1}^{ACK}$, $g_i$ (i=0, ..., H'-1) is a column vector of length $Q_m$ ($H=H/Q_m$). $q_i^{ACK}$, (i=0, ..., Q'_{ACK}-1) is a column vector of length $Q_m$ for ACK/NACK ($Q'_{ACK}=Q_{ACK}/Q_m$). $q_i^{RI}$ (i=0, ..., Q'_{RI}-1) is a column vector of length $Q_m$ for RI ($Q'_{RI}=Q_{RI}/Q_m$).

A channel interleaver multiplexes control information and UL-SCH data for transmission of a PUSCH. Channel interleaving includes a process of mapping of control information and UL-SCH data to a channel interleaver matrix corresponding to PUSCH resources.

After channel interleaving is performed, a bit sequence $h_0, h_1, h_2, \ldots, h_{H+Q_{RI}-1}$ read from the channel interleaver matrix row by row is generated. The read bit sequence is mapped onto a resource grid. H'' (=H'+Q'_{RI}) modulation symbols are transmitted through a subframe.

Figure 7:
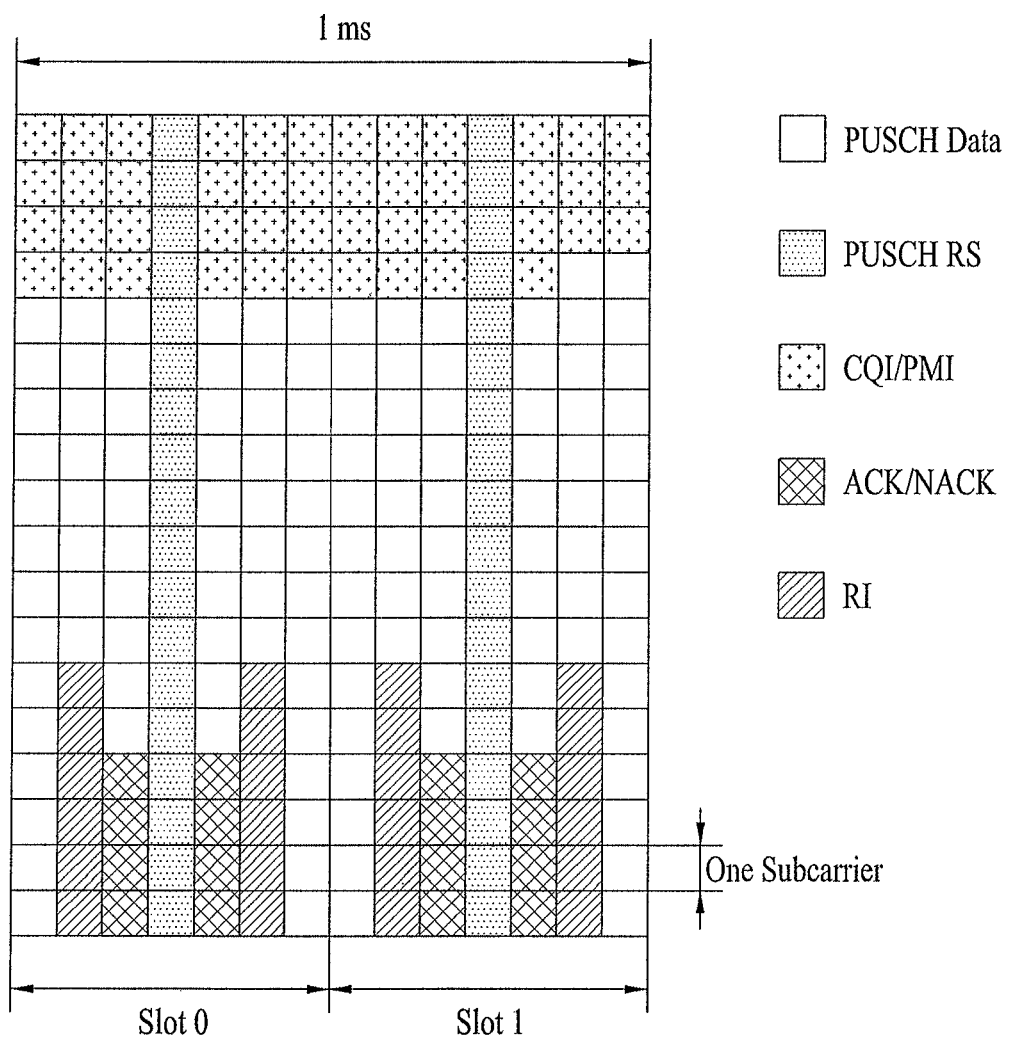
FIG. 7 illustrates multiplexing of control information and UL-SCH data on a PUSCH.

FIG. 7 illustrates multiplexing of control information and UL-SCH data on a PUSCH. If it is desired to transmit control information in a subframe to which PUSCH transmission is allocated, a UE multiplexes control information (UCI) and UL-SCH data prior to DFT spreading. The control information includes at least one of CQI/PMI, HARQ ACK/NACK, and RI. The number of REs used for transmission of each of CQI/PMI, HARQ ACK/NACK, and RI depends on a Modulation and Coding Scheme (MCS) and an offset value (each of $\Delta_{offset}^{CQI}$, $\Delta_{offset}^{HARQ-ACK}$, and $\Delta_{offset}^{RI}$). The offset value permits a different coding rate according to control information and is semi-statically set by higher layer (e.g. RRC) signaling. The UL-SCH data and control information are not mapped to the same RE. The control information is mapped to be present in two slots of a subframe. Since a BS can pre-recognize control information to be transmitted through a PUSCH, the BS may easily demultiplex the control information and data packets.

Referring to FIG. 7, CQI and/or PMI (CQI/PMI) resources are located at the beginning part of UL-SCH data resources. and are sequentially mapped to all SC-FDMA symbols on one subcarrier and then to symbols on the next subcarrier. The CQI/PMI resources are mapped starting from left to right in each subcarrier, namely, in the direction of ascending an SC-FDMA symbol index. PUSCH data (UL-SCH data) is rate-matched in consideration of the amount of CQI/PMI resources (i.e. the number of encoded symbols). A modulation order which is the same as the modulation order of the UL-SCH data is used for CQI/PMI. If the size of CQI/PMI information (payload size) is small (e.g. 11 bits or less), the CQI/PMI information may use a (32, k) block code in a similar way to PUCCH transmission and encoded data may be cyclically repeated. A CRC is not used when the size of CQI/PMI information is small. If size of CQI/PMI information is large (e.g. 11 bits or more), an 8-bit CRC is attached and channel coding and rate matching are performed using a tail-biting convolutional code. ACK/NACK is inserted through puncturing into a portion of SC-FDMA resources to which the UL-SCH data is mapped. ACK/NACK is located next to an RS and is filled from the bottom to top of a corresponding SC-FDMA symbol, i.e. in the direction of ascending a subcarrier index. In a normal CP, SC-FDMA symbols for ACK/NACK are located at SC-FDMA symbols #2 and #5 in each slot as shown in FIG. 7. Irrespective of whether ACK/NACK is actually transmitted in a subframe, an encoded RI symbol is located next to the symbol for ACK/NACK. ACK/NACK, RI and CQI/PMI are independently encoded.

In LTE, control information (e.g. QPSK modulated) may be scheduled to be transmitted on a PUSCH without UL-SCH data. Control information (CQI/PMI, RI, and/or ACK/NACK) is multiplexed before DFT-spreading in order to maintain low Cubic Metric (CM) and single-carrier properties. Multiplexing of ACK/NACK, RI, and CQI/PMI is similar to multiplexing illustrated in FIG. 7. An SC-FDMA symbol for ACK/NACK is located next to an RS and CQI-mapped resources may be punctured. The numbers of REs for ACK/NACK and RI are based on a reference MCS (CQI/PMI MCS) and an offset parameter ($\Delta_{offset}^{CQI}$, $\Delta_{offset}^{HARQ-ACK}$, or $\Delta_{offset}^{RI}$). The reference MCS is calculated from a CQI payload size and resource allocation. Channel coding and rate matching for control signaling without UL-SCH data is identical to channel coding and rate matching for control signaling with the UL-SCH data.

When UCI is transmitted through a PUSCH, a UE should determine the number of coded symbols for the UCI, $Q'_{UCI}$, for channel coding (refer to S150, S160, and S170 of FIG. 5).

$$Q' = \min\left(\left\lceil \frac{(O+L) \cdot M_{SC}^{PUSCH-initial} \cdot N_{symb}^{PUSCH-initial} \cdot \beta_{offset}^{PUSCH}}{\sum_{r=0}^{C-1} K_r} \right\rceil, M_{SC}^{PUSCH} \cdot N_{symb}^{PUSCH} - \frac{Q_{RI}}{Q_m}\right)$$ [Equation 1]

where O is the number of CQI/PMI bits, L and is the number of CRC bits given by 0 when O is 11 or less and, otherwise, 8. $Q_{CQI}=Q_m \cdot Q'$ and $Q_m$ is a modulation order. $Q_{RI}$ is the number of coded RI bits and $Q_{RI}=0$ when an RI is not transmitted. $\beta_{offset}^{PUSCH}$ denotes an offset value and may be used for controlling the coding rate of CQI/PMI. $\beta_{offset}^{PUSCH}$ is given by $\beta_{offset}^{PUSCH} = \beta_{offset}^{CQI}$. $M_{SC}^{PUSCH-initial}$ denotes a bandwidth scheduled for initial PUSCH transmission of a transport block and is expressed by the number of subcarriers.

$N_{symb}^{PUSCH-initial}$ is the number of SC-FDMA symbols per subframe for initial PUSCH transmission of the same transport block and is given by $N_{symb}^{PUSCH-initial}=(2 \cdot (N_{symb}^{UL}-1)-N_{SRS})$ where $N_{symb}^{UL}$ is the number of SC-FDMA symbols per slot and $N_{SRS}$ is 0 or 1. $N_{SRS}$ is equal to 1 if UE is configured to transmit a PUSCH and an SRS in a subframe for initial transmission or if PUSCH resource allocation for initial transmission even partially overlaps with a cell specific SRS subframe and bandwidth. Otherwise $N_{SRS}$ is equal to 0.

$$\sum_{r=0}^{C-1} K_r$$

denotes the number of bits of a data payload (including CRC) for initial PUSCH transmission of the same transport block. C is the total number of code blocks, r is a code block number, and $K_r$ is the number of bits of a code block r. $M_{SC}^{PUSCH-initial}$, C, and $K_r$ are obtained from an initial PDCCH for the same transport block. ⌈n⌉ is a ceiling function and indicates the smallest integer number among n or more. min (a, b) denotes the smaller of 'a' and 'b'.

A method for determining the number of coded symbols, Q', for UCI in a legacy LTE system will now be described by way of example of ACK/NACK (or RI). Equation 2 is defined in LTE.

$$Q' = \min\left(\left\lceil \frac{O \cdot M_{SC}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{SC}^{PUSCH}\right)$$ [Equation 2]

where O is the number of ACK/NACK (or RI) bits, $$\sum_{r=0}^{C-1} K_r$$

denotes the number of information bits transmitted through a PUSCH. $M_{SC}^{PUSCH-initial}$ is a bandwidth for PUSCH transmission for a transport block and $N_{SC}^{PUSCH-initial}$ is the number of symbols per subframe for PUSCH transmission for a transport block. Accordingly, $M_{SC}^{PUSCH-initial}$ · $N_{symb}^{PUSCH-initial}$ is the number of modulation symbols transmitted through a PUSCH. $\beta_{offset}^{PUSCH}$ is an offset value indicating how much control information is to further be transmitted compared with data information and is defined per transport block.

The numbers of REs for CQI and ACK/NACK (or RI) may be expressed as the number of coded modulation symbols.

The above description may be applied only when one codeword (corresponding to a transport block) is transmitted on a PUSCH because a legacy LTE system does not support Single User (SU)-MIMO. However, since an LTE-A system supports SU-MIMO, a plurality of codewords may be transmitted on the PUSCH. Accordingly, a method for multiplexing a plurality of codewords and UCI is needed.

A method for efficiently multiplexing a plurality of pieces of data and UCI will be described below. For convenience, while UL-SCH transmission in the following description is described based on a transport block, the transport block and a codeword are data blocks equivalent to each other. Accordingly, the transport block and the codeword may collectively be referred to as a (UL-SCH) data block. Unless mentioned otherwise, the codeword in the following description may be replaced with a corresponding transport block and vice versa. A relationship between the codeword and the transport block may be changed by codeword swapping. For example, in a normal case, the first transport block and the second transport block correspond to the first codeword and the second codeword, respectively. Meanwhile, if codeword swapping is adopted, the first transport block may correspond to the second codeword and the second transport block may correspond to the first codeword. HARQ operation is performed based on the transport block. The following embodiments may be implemented independently or in combination.

Multiplexing of UCI (ACK/NACK, RI, and CQI) and PUSCH data on a PUSCH has been conventionally transmitted through one transport block (or codeword) having one layer.

Recently, as a result of introducing a method for transmitting multiplexing of UCI and PUSCH data through SU-MIMO, the UCI and PUSCH data are multiplexed through one or more transport blocks (or codewords) having one or plural layers.

The following Equation 3 is to calculate the number of modulation symbols, $Q'_{UCI}$, for transmitting multiplexed control information (UCI) in consideration of a plurality of transport blocks or a plurality of layers.

$$Q'_{UCI} = \min\left(\left\lceil \frac{O \cdot M_{SC}^{PUSCH\_Initial} \cdot N_{Symb}^{PUSCH\_Initial} \cdot \beta_{set}}{\sum_{i=0}^{N_{TB}-1} \sum_{r=0}^{C_i-1} K_{r,i}} \right\rceil, 4M_{SC}^{PUSCH}\right)$$ [Equation 3]

Using Equation 3, the number of REs allocated to ACK/NACK or RI in multiplexing of UCI and PUSCH data is calculated. In Equation 3, $$\sum_{i=0}^{N_{TB}-1} \sum_{r=0}^{C_i-1} K_{r,i}$$

is the total number of bits of transport blocks for data transmission, $N_{TB}$ is the number of transport blocks, $C_i$ is the total number of code blocks, r is a code block number, $K_r$ is the number of bits of a code block r. Other parameters conform to those of Equation 1 and Equation 2 and definition in LTE.

A beta offset $\beta_{sel}$ in Equation 3 is a value selected to be identically applied to all transport blocks. The present invention selects the beta offset $\beta_{sel}$ when a plurality of transport blocks is considered. The beta offset value may be determined through the following embodiments.

Equation 3 is set to consider $$\sum_{i=0}^{N_{TB}-1} \sum_{r=0}^{C_i-1} K_{r,i}$$

in the cases in which control information is transmitted to a plurality of transport blocks. That is, not only the number of bits of one transport block, $$\sum_{r=0}^{C_i-1} K_r,$$

but also the number of bits of a plurality of transport blocks, $$\sum_{i=0}^{N_{TB}-1} \sum_{r=0}^{C_i-1} K_{r,i},$$

is considered. The number of symbols for UCI, $Q'_{UCI}$ may be determined in consideration of the beta offset $\beta_{sel}$ selected for a plurality of transport blocks and the number of data bits for a plurality of transport blocks, $$\sum_{i=0}^{N_{TB}-1} \sum_{r=0}^{C_i-1} K_{r,i}.$$

If UCI and PUSCH data are transmitted by repetitively mapping UCI to all or some layers, a beta offset value necessary when mapping REs of a proper number to each of UCI and PUSCH data may be determined.

Meanwhile, in the case of transport blocks (or codewords) to which UCI is transmitted, beta offset values for the respective transport blocks have been set. However, when UCI and PUSCH data are multiplexed through one or more transport blocks having a plurality of layers, since the beta offset values $\beta_{sel}$ determined from the respective transport blocks (or codewords) become different, use of the beta offset values may be problematic when UCI is repeated or spread using the same number of REs with respect to all or some layers.

The present invention proposes an appropriate criterion for the beta offset value when UCI and PUSCH data are multiplexed using a plurality of transport blocks (or codewords).

Figure 8:
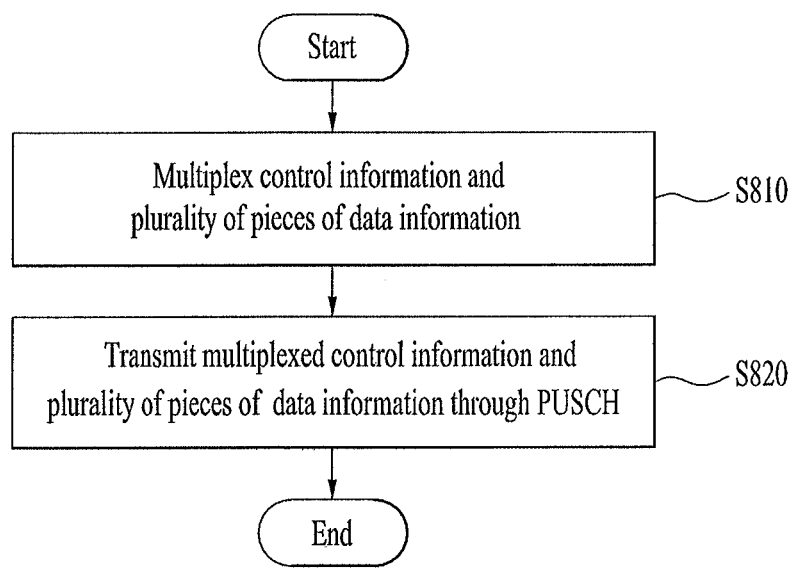
FIG. 8 is a flowchart illustrating an uplink signal transmission method according to the present invention.

FIG. 8 is a flowchart schematically illustrating a UL signal transmission method related to the present invention.

A processor of the present invention multiplexes control information such as UCI and a plurality of pieces of data information (e.g. transport blocks) (S810). An RF module transmits the multiplexed control information and data information through a PUSCH (S820). In the multiplexing step, a beta offset value selected to determine the number of channel coded symbols related to a plurality of data blocks is set to have one value.

For convenience of description in this specification, a transport block and a codeword may be used as the same meaning.

When UCI (RI, ACK/NACK, and CQI) and data information are multiplexed through a plurality of transport blocks, a beta offset value used for calculating REs allocated to ACK/NACK or RI may be determined by the above embodiments.

Since CQI information among UCI is transmitted through one transport block, a beta offset value determined according to the present invention corresponds to a beta offset value related to ACK/NACK or RI which can be transmitted through a plurality of transport blocks. The beta offset value related to ACK/NACK and the beta offset value related to RI are independently determined.

As a first embodiment for determining a beta offset value, a beta offset value of a transport block through which CQI is transmitted may be used. CQI is transmitted through one transport block rather than through all transport blocks as opposed to ACK/NACK or RI. When calculating the number of REs allocated to ACK/NACK or RI, a beta offset value corresponding to a transport block through which CQI is transmitted may be used.

As a second embodiment for determining a beta offset value, a beta offset value of a transport block having a high MCS may be used. Generally, since a transport block or channel having a high MCS indicates good channel conditions, a beta offset value corresponding thereto may be used.

In other words, if a beta offset value used when the number of REs is calculated is $\beta_{sel}$ and a beta offset value corresponding to an i-th transport block is $\beta_i$, then $\beta_{sel}=\beta_{i_{HMCS}}$ where $i_{HMCS}$ is an index of a transport block having the highest MCS level.

A third embodiment for determining a beta offset value corresponds to an opposite case of the second embodiment. Namely, in the third embodiment, a beta offset value of a transport block having a low MCS may be used.

That is, if a beta offset value used when the number of REs is calculated is $\beta_{sel}$ and a beta offset value corresponding to an i-th transport block is $\beta_i$, then $\beta_{sel}=\beta_{i_{LMCS}}$ where $i_{LMCS}$ is an index of a transport block having the lowest MCS level.

As a fourth embodiment for determining a beta offset, the largest of beta offset values corresponding to a plurality of transport blocks.

Namely, if a beta offset value used when the number of REs is used is $\beta_{sel}$ and a beta offset value corresponding to an i-th transport block is $\beta_i$, then $\beta_{sel}$ satisfies $\beta_{sel}=\max\{\beta_i|i=0,\ldots,N_{TB}-1\}$.

A fifth embodiment for determining a beta offset value corresponds to an opposite case of the fourth embodiment. That is, the smallest of beta offset values corresponding to a plurality of transport blocks may be used.

Namely, if a beta offset value used when the number of REs is used is $\beta_{sel}$ and a beta offset value corresponding to an i-th transport block is $\beta_L$, then $\beta_{sel}$ satisfies $\beta_{sel}=\min\{\beta_i|i=0,\ldots,N_{TB}-1\}$.

A sixth embodiment for determining a beta offset may use an average value of beta offset values corresponding to a plurality of transport blocks.

The average value may be a simple average value of the respective beta offset values or may be a weighted average value of the respective beta offset values obtained by adding weight values to the numbers of layers corresponding to the respective transport blocks.

The beta offset value determined by a simple average value of beta offset values corresponding to a plurality of transport blocks is calculated by Equation 4.

$$\beta_{set} = \frac{\sum_{i=0}^{N_{TB}-1} \beta_i}{N_{TB}}$$ [Equation 4]

where $N_{TB}$ is the number of data blocks.

The beta offset value determined by a weighted average value of the respective beta offset values obtained by adding weight values to the numbers of layers corresponding to the respective transport blocks is calculated by Equation 5.

$$\beta_{set} = \frac{\sum_{i=0}^{N_{TB}-1} N_{Layer}^i \cdot \beta_i}{\sum_{i=0}^{N_{TB}-1} N_{Layer}^i}$$ [Equation 5]

where $N_{Layer}^i$ is the number of layers for a specific data block and $N_{TB}$ is the number of data blocks.

As a seventh embodiment for determining a beta offset value, a beta offset value of a transport block having the largest Transport Block Size (TBS) may be used.

That is, if a beta offset value used when the number of REs is calculated is $\beta_{sel}$ and a beta offset value corresponding to an i-th transport block is $\beta_i$, then $\beta_{sel}=\beta_{i_{HTBS}}$ where $i_{HTBS}$ is an index of a transport block having the largest TBS.

An eighth embodiment for determining a beta offset value corresponds to an opposite case of the seventh embodiment. That is, a beta offset value of a transport block having the smallest TBS may be used.

In more detail, if a beta offset value used when the number of REs is used is $\beta_{sel}$ and a beta offset value corresponding to an i-th transport block is $\beta_i$, then $\beta_{sel}=\beta_{i_{LTBS}}$ where $i_{LTBS}$ is an index of a transport block having the smallest TBS.

Although the number of modulation symbols, Q', for transmitting multiplexed control information is set using equations other than the above equations, the method proposed in the present invention is applicable to the case in which an offset β which is an energy ratio per information bit of data and control information is used in the process of calculating the number of modulation symbols.

Figure 9:
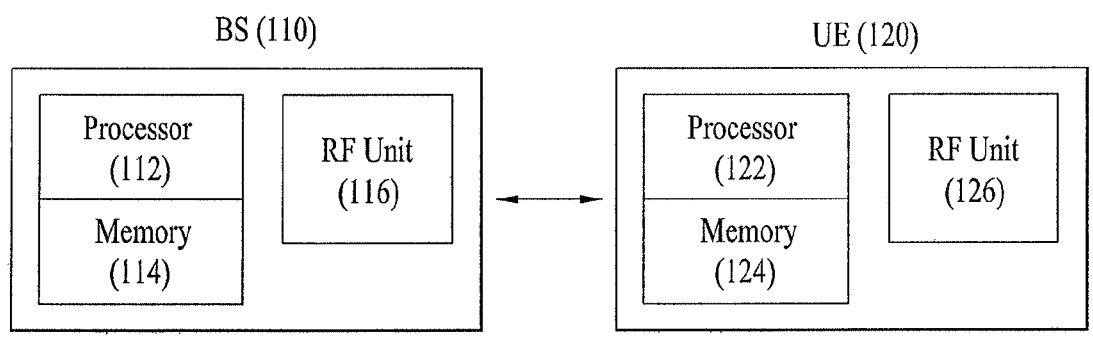
FIG. 9 illustrates a BS and a UE that are applicable to the embodiments of the present invention.

FIG. 9 illustrates a BS and a UE that are applicable to the embodiments of the present invention. If a wireless communication system includes a relay, communication in a backhaul link is performed between a BS and the relay and communication in an access link is performed between the relay and a UE. Accordingly, the BS or UE shown in FIG. 9 may be replaced with the relay according to situation.

Referring to FIG. 9, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores information associated with operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention in a predetermined manner. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that do not explicitly cite each other in the appended claims may be presented in combination as an embodiment of the present invention or included as a new claim by subsequent amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be used for wireless communication devices such as a UE, a relay, and a BS.

The invention claimed is:

1. A method for transmitting an uplink signal at a user equipment in a wireless communication system, comprising:
   multiplexing control information and a plurality of pieces of data information; and
   transmitting the multiplexed control information and the plurality of pieces of data information on a physical uplink shared channel,
   wherein the number of modulation symbols, Q', for transmitting the multiplexed control information is determined by the following Equation 1:

$$Q' = \left\lceil \frac{O \cdot M_{SC}^{DATA} \cdot N_{Symb}^{DATA} \cdot \beta_{set}}{\sum_{i=0}^{N_{TB}-1} TBS_i} \right\rceil \quad \text{[Equation 1]}$$

where O is the number of bits of the control information, $$\sum_{i=0}^{N_{TB}-1} TBS_i$$

is the sum of the numbers of bits of the plurality of pieces of data information, $M_{SC}^{DATA}$ is a frequency band scheduled for transmission of the plurality of pieces of data information, $N_{symb}^{DATA}$ is the number of symbols per subframe for transmission of the plurality of pieces of data information, $\lceil \ \rceil$ is a ceiling function, and $N_{TB}$ is the number of the plurality of pieces of data information, and
   wherein a selection offset $\beta_{sel}$ is a value set by a preset condition among offset values corresponding respectively to the plurality of pieces of data information.

2. The method of claim 1, wherein the control information is any one of Acknowledgment/Negative-Acknowledgment (ACK/NACK) information or Rank Indication (RI) information.

3. The method of claim 1, wherein the selection offset $\beta_{sel}$ is an offset corresponding to Channel Quality Indicator (CQI) information and the multiplexed data information.

4. The method of claim 1, wherein the selection offset $\beta_{sel}$ is any one of an offset corresponding to data information having a highest Modulation Coding Scheme (MCS) level among the plurality of pieces of data information and an offset corresponding to data information having a lowest MCS level among the plurality of pieces of data information.

5. The method of claim 1, wherein the selection offset $\beta_{sel}$ is any one of a smallest offset and a largest offset among offsets corresponding respectively to the plurality of pieces of data information.

6. The method of claim 1, wherein the selection offset $\beta_{sel}$ is an average of offsets corresponding respectively to the plurality of pieces of data information.

7. The method of claim 1, wherein the selection offset $\beta_{sel}$ is selected according to the following Equation 2 by an average of offsets using an offset $\beta_i$ corresponding respectively to the plurality of pieces of data information and the number of layers corresponding respectively to the plurality of pieces of data information:

$$\beta_{set} = \frac{\sum_{i=0}^{N_{TB}-1} N_{Layer}^i \cdot \beta_i}{\sum_{i=0}^{N_{TB}-1} N_{Layer}^i} \quad \text{[Equation 2]}$$

where $N_{Layer}^i$ is the number of layers for specific data information and $N_{TB}$ is the number of the plurality of pieces of data information.

8. The method of claim 1, wherein the selection offset $\beta_{sel}$ is any one of an offset corresponding to data information having a largest Transport Block Size (TBS) among the plurality of pieces of data information and an offset corresponding to data information having a smallest TBS among the plurality of pieces of data information.

9. A user equipment for transmitting an uplink signal in a wireless communication system, comprising:
- a processor for multiplexing control information and a plurality of pieces of data information; and
- a Radio Frequency (RF) unit for transmitting the multiplexed control information and the plurality of pieces of data information on a physical uplink shared channel, wherein the number of modulation symbols, Q', for transmitting the multiplexed control information is determined by the following Equation 1:

$$Q' = \left\lceil \frac{O \cdot M_{SC}^{DATA} \cdot N_{Symb}^{DATA} \cdot \beta_{set}}{\sum_{i=0}^{N_{TB}-1} TBS_i} \right\rceil \quad \text{[Equation 1]}$$

where O is the number of bits of the control information, $$\sum_{i=0}^{N_{TB}-1} TBS_i$$

is the sum of the numbers of bits of the plurality of pieces of data information, $M_{SC}^{DATA}$ is a frequency band scheduled for transmission of the plurality of pieces of data information, $N_{symb}^{DATA}$ is the number of symbols per subframe for transmission of the plurality of pieces of data information, $\lceil\ \rceil$ is a ceiling function, and $N_{TB}$ is the number of the plurality of pieces of data information, and
  - wherein a selection offset $\beta_{sel}$ is a value set by a preset condition among offset values corresponding respectively to the plurality of pieces of data information.

10. The user equipment method of claim 9, wherein the control information is any one of Acknowledgment/Negative-Acknowledgment (ACK/NACK) information and Rank Indication (RI) information.

11. The user equipment method of claim 9, wherein the selection offset $\beta_{sel}$ is an offset corresponding to Channel Quality Indicator (CQI) information and the multiplexed data information.

12. The user equipment method of claim 9, wherein the selection offset $\beta_{sel}$ is any one of an offset corresponding to data information having a highest Modulation Coding Scheme (MCS) level among the plurality of pieces of data information and an offset corresponding to data information having a lowest MCS level among the plurality of pieces of data information.

13. The user equipment method of claim 9, wherein the selection offset $\beta_{sel}$ is any one of a smallest offset and a largest offset among offsets corresponding respectively to the plurality of pieces of data information.

14. The user equipment method of claim 9, wherein the selection offset $\beta_{sel}$ is an average of offsets corresponding respectively to the plurality of pieces of data information.

15. The user equipment method of claim 9, wherein the selection offset $\beta_{sel}$ is selected according to the following Equation 2 by an average of offsets using an offset $\beta_i$ corresponding respectively to the plurality of pieces of data information and the number of layers corresponding respectively to the plurality of pieces of data information:

$$\beta_{set} = \frac{\sum_{i=0}^{N_{TB}-1} N_{Layer}^i \cdot \beta_i}{\sum_{i=0}^{N_{TB}-1} N_{Layer}^i} \quad \text{[Equation 2]}$$

where $N_{Layer}^i$ is the number of layers for specific data information and $N_{TB}$ is the number of the plurality of pieces of data information.

16. The user equipment method of claim 9, wherein the selection offset $\beta_{sel}$ is any one of an offset corresponding to data information having a largest Transport Block Size (TBS) among the plurality of pieces of data information and an offset corresponding to data information having a smallest TBS among the plurality of pieces of data information.

* * * * *